US012764244B2

(12) United States Patent
Nonaka

(10) Patent No.: US 12,764,244 B2
(45) Date of Patent: Oct. 13, 2026

(54) INFORMATION PROCESSING SYSTEM AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventor: Hiroshige Nonaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/163,281

(22) Filed: Feb. 2, 2023

(65) Prior Publication Data

US 2024/0056540 A1 Feb. 15, 2024

(30) Foreign Application Priority Data

Aug. 10, 2022 (JP) ................................ 2022-128323

(51) Int. Cl.
*G06F 15/00* (2006.01)
*H04N 1/00* (2006.01)
(Continued)

(52) U.S. Cl.
CPC ..... *H04N 1/32101* (2013.01); *H04N 1/00244* (2013.01); *H04N 1/21* (2013.01);
(Continued)

(58) Field of Classification Search
None
See application file for complete search history.

(56) References Cited

U.S. PATENT DOCUMENTS 8,065,406 B2 11/2011 Kishimoto
10,015,356 B2 7/2018 Hori
(Continued)

FOREIGN PATENT DOCUMENTS

JP 2010016487 1/2010
JP 2016178565 10/2016
(Continued)

OTHER PUBLICATIONS

"Notice of reasons for refusal of Japan Counterpart Application", issued on Apr. 14, 2026, with English translation thereof, pp. 1-6.

*Primary Examiner* — Mark R Milia
(74) *Attorney, Agent, or Firm* — JCIPRNET

(57) ABSTRACT

An information processing system includes a first information processing apparatus that executes a predetermined process, and a second information processing apparatus that is communicably connected to the first information processing apparatus via a firewall and that executes a part of the process in response to a request from the first information processing apparatus, in which the first information processing apparatus includes a first processor, the first processor is configured to record, in executing the process, logs of the process with a first identifier for identifying the process, the second information processing apparatus includes a second processor, the second processor is configured to record, in executing the process, logs of the process with a second identifier for identifying the process, and the first processor or the second processor is configured to link the first identifier to the second identifier and record the logs recorded by the first processor and the logs recorded by the second processor in a unified manner.

13 Claims, 4 Drawing Sheets

(51) Int. Cl.
*H04N 1/21* (2006.01)
*H04N 1/32* (2006.01)

(52) U.S. Cl.
CPC ..... *H04N 1/32502* (2013.01); *H04N 1/32545* (2013.01); *H04N 2201/0094* (2013.01)

(56) References Cited

U.S. PATENT DOCUMENTS

| | | | | |
|---|---|---|---|---|
| 10,795,628 | B2 | 10/2020 | Tokiwa | |
| 2016/0274824 | A1* | 9/2016 | Sasaki | H04N 1/00347 |
| 2019/0286401 | A1* | 9/2019 | Yasuda | G06F 3/1275 |

FOREIGN PATENT DOCUMENTS

| | | |
|---|---|---|
| JP | 6264800 | 1/2018 |
| JP | 2020087158 | 6/2020 |

* cited by examiner

INFORMATION PROCESSING SYSTEM AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2022-128323 filed Aug. 10, 2022.

BACKGROUND

(i) Technical Field

The present invention relates to an information processing system and a non-transitory computer readable medium storing an information processing program.

(ii) Related Art

JP6264800B discloses an information processing system including a plurality of information processing apparatuses that execute a plurality of processes defined by workflow information. The workflow information is information in which an order of the plurality of processes and an information processing apparatus as an execution entity of each of the plurality of processes are defined. One information processing apparatus selected among the plurality of information processing apparatuses can be defined as the execution entity. Among the plurality of information processing apparatuses, the information processing apparatus defined as the execution entity executes each of the plurality of processes defined in the workflow information in the defined order, and one information processing apparatus selected in accordance with a predetermined determination condition executes a process of which an execution entity is defined as the one information processing apparatus selected among the plurality of information processing apparatuses in the workflow information.

SUMMARY

There is a system in which a multifunction peripheral having a function of transmitting a scanned document to a designated storage destination requests a part of processes (OCR and the like) requiring time to a cloud service and the multifunction peripheral of a requester receives a document of a processing result and transmits the document to the designated storage destination.

In such a system, logs in which the processing result is recorded are stored on each of a cloud service side and a multifunction peripheral side. In a case of checking the processing result, details are not known unless the logs are acquired from both of the cloud service and the multifunction peripheral. Accordingly, an effort for checking is required.

Aspects of non-limiting embodiments of the present disclosure relate to an information processing system and a non-transitory computer readable medium storing an information processing program that enable a processing result to be easily checked, compared to a case of acquiring logs from both of a cloud service and a multifunction peripheral.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a first information processing apparatus that executes a predetermined process, and a second information processing apparatus that is communicably connected to the first information processing apparatus via a firewall and that executes a part of the process in response to a request from the first information processing apparatus, in which the first information processing apparatus includes a first processor, the first processor is configured to record, in executing the process, logs of the process with a first identifier for identifying the process, the second information processing apparatus includes a second processor, the second processor is configured to record, in executing the process, logs of the process with a second identifier for identifying the process, and the first processor or the second processor is configured to link the first identifier to the second identifier and record the logs recorded by the first processor and the logs recorded by the second processor in a unified manner.

BRIEF DESCRIPTION OF THE DRAWINGS

Exemplary embodiment(s) of the present invention will be described in detail based on the following figures, wherein.

DETAILED DESCRIPTION

Figure 1:
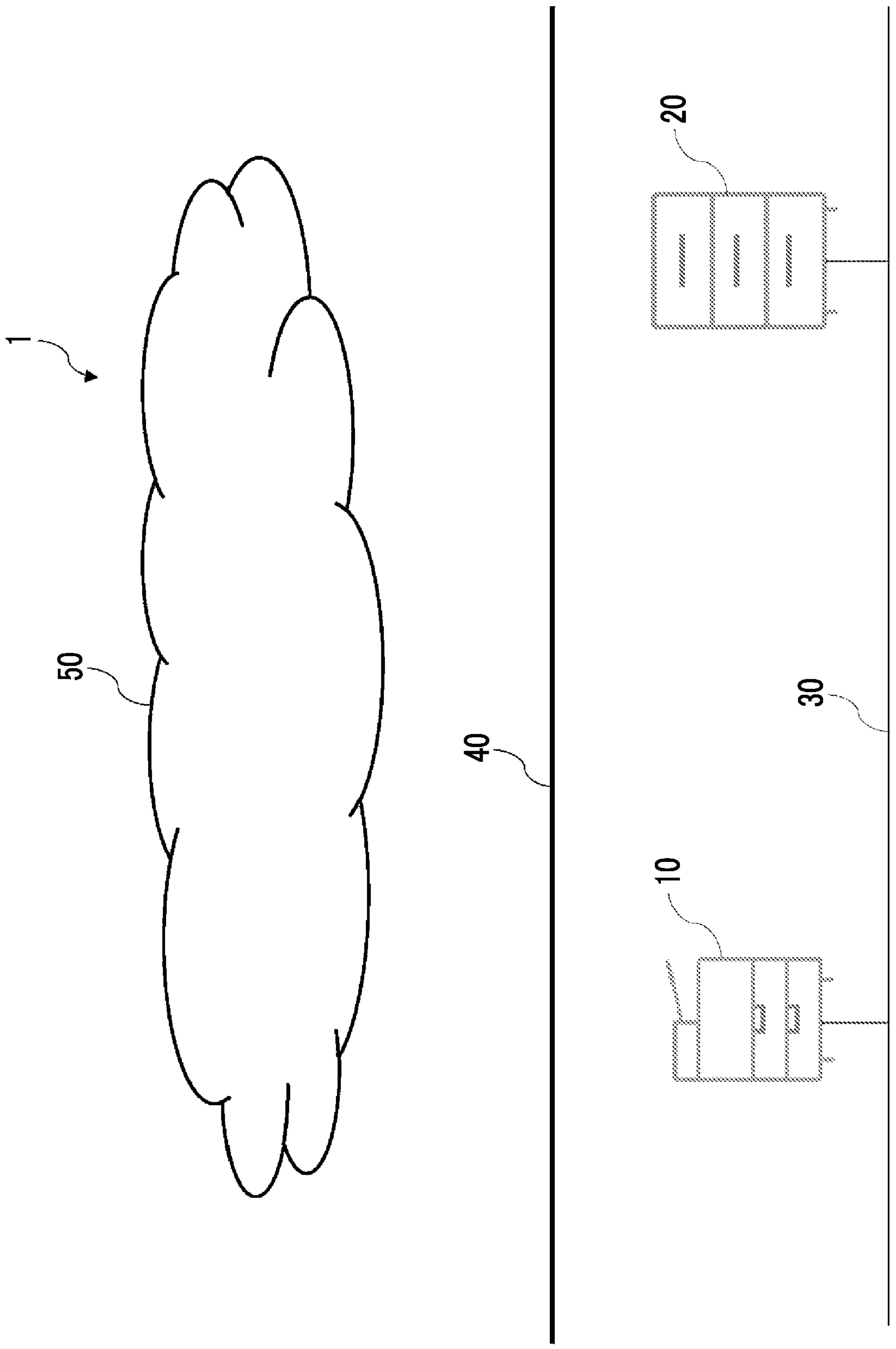
FIG. 1 is a diagram illustrating a schematic configuration of an image processing system according to a present exemplary embodiment.

Hereinafter, an example of an exemplary embodiment of the present invention will be described with reference to the drawings. In each drawing, identical or equivalent constituents and parts are designated by identical reference signs. In addition, dimensional ratios in the drawings are exaggerated for convenience of description and may be different from actual ratios.

FIG. 1 is a diagram illustrating a schematic configuration of an image processing system 1 according to the present exemplary embodiment. The image processing system 1 illustrated in FIG. 1 is an example of an information processing system according to the exemplary embodiment of the present invention. The image processing system 1 includes a multifunction peripheral 10 that is an example of a first information processing apparatus according to the exemplary embodiment of the present invention, a file server 20, and a cloud server 50 that is an example of a second information processing apparatus according to the exemplary embodiment of the present invention. Each of the multifunction peripheral 10 and the file server 20 is connected to a local area network (LAN) 30 and is present in an identical network segment. The multifunction peripheral 10 and the file server 20 are protected from an outside network such as the Internet by a firewall 40.

The multifunction peripheral 10 is an apparatus having any plurality of functions among a plurality of functions such as a copying function, a printing function, a scanner function, a facsimile function, and an optical character recognition (OCR) function. For example, in a case where a print job is received from a personal computer or the like, not illustrated, the multifunction peripheral 10 executes a printing process based on the print job. In addition, for example, the multifunction peripheral 10 has a function of scanning a document and transmitting scanned data to the personal computer, not illustrated, or the file server 20. While only one multifunction peripheral 10 is illustrated in FIG. 1, the number of multifunction peripherals 10 may be two or more in the image processing system 1.

The cloud server 50 is a server that executes a process based on a request of the multifunction peripheral 10 in cooperation with the multifunction peripheral 10. The cloud server 50 is implemented by a server present on a cloud network. In the present exemplary embodiment, the cloud server 50 generates text data from optically scanned scan data by executing the OCR function of recognizing the scan data. While only one cloud server 50 is illustrated in FIG. 1, the cloud server 50 may be configured with two or more servers in the image processing system 1.

In a case where the number of documents to be scanned by the multifunction peripheral 10 is small, a processing time required for character recognition of the scan data by the OCR function of the multifunction peripheral 10 is not long. However, in a case where the multifunction peripheral 10 has scanned a large number of documents, the processing time required for character recognition of the scan data by the OCR function of the multifunction peripheral 10 may be long. Therefore, the multifunction peripheral 10 transmits the scan data to the cloud server 50 and requests the cloud server 50 to process the scan data.

The firewall 40 is present between the multifunction peripheral 10 and the file server 20, and the cloud server 50. Thus, the cloud server 50 cannot transmit the generated text data to the file server 20 as a destination. Accordingly, in order to store the text data in the file server 20, the multifunction peripheral 10 downloads the text data generated by the cloud server 50 from the cloud server 50. The multifunction peripheral 10 transmits the downloaded text data to the file server 20.

In a case where the scan data is transmitted to the cloud server 50, the multifunction peripheral 10 performs polling to the cloud server 50 as to whether or not the generation of the text data is completed. In a case where the generation of the text data is completed, the cloud server 50 responds to the multifunction peripheral 10 to notify that the generation of the text data is completed with respect to the polling from the multifunction peripheral 10.

In the image processing system 1 having such a configuration, the multifunction peripheral 10 and the cloud server 50 store logs related to processes independently of each other. In the present exemplary embodiment, the logs related to processes will be referred to as job logs.

The multifunction peripheral 10 records job logs related to a series of processes from scanning of document data to transmission of the text data to the file server 20, with an identical job ID. In addition, the cloud server 50 records job logs related to a series of processes from reception of the scan data from the multifunction peripheral 10 to conversion of the text data, with an identical unified job ID.

In a case where the multifunction peripheral 10 and the cloud server 50 store the job logs independently of each other, acquiring the job logs from the multifunction peripheral 10 and the cloud server 50 and then, comparing the job logs with each other are necessary in checking a processing result, and an effort is required.

The cloud server 50 executes processes by receiving requests from a plurality of the multifunction peripherals 10. Thus, an amount of job logs stored in the cloud server 50 is much larger than an amount of job logs stored in one multifunction peripheral 10. Thus, an effort for searching for the job logs of the cloud server 50 corresponding to a process of the multifunction peripheral 10 is required.

The image processing system 1 according to the present exemplary embodiment enables the processing result to be easily checked, compared to a case of acquiring the job logs from both of the multifunction peripheral 10 and the cloud server 50. Specifically, the multifunction peripheral 10 and the cloud server 50 store the job logs recorded in each of the multifunction peripheral 10 and the cloud server 50 in a unified manner. A process of unifying the job logs may be executed by the multifunction peripheral 10 or may be executed by the cloud server 50. In the following description, a process of unifying the job logs by the cloud server 50 will be described as an example of the process of unifying the job logs.

Next, a hardware configuration of the multifunction peripheral 10 will be described.

Figure 2:
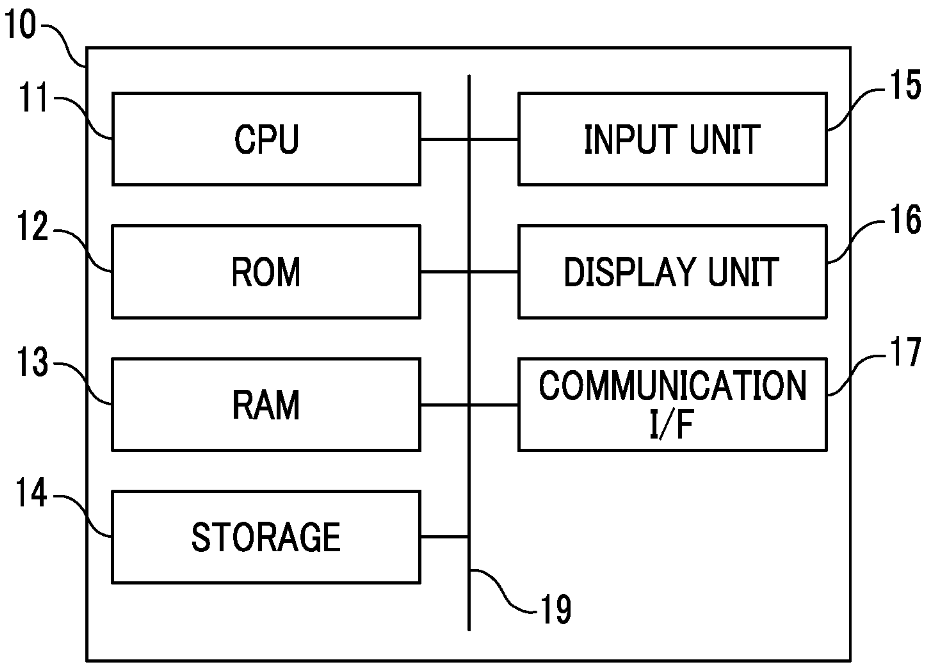
FIG. 2 is a block diagram illustrating a hardware configuration of a multifunction peripheral.

FIG. 2 is a block diagram illustrating a hardware configuration of the multifunction peripheral 10.

As illustrated in FIG. 2, the multifunction peripheral 10 includes a central processing unit (CPU) 11, a read only memory (ROM) 12, a random access memory (RAM) 13, a storage 14, an input unit 15, a display unit 16, and a communication interface (I/F) 17. These configurations are communicably connected to each other via a bus 19.

The CPU 11 is an example of a first processor according to the exemplary embodiment of the present invention. The CPU 11 is a central calculation processing unit and executes various programs or controls each unit. That is, the CPU 11 reads a program from the ROM 12 or the storage 14 and executes the program using the RAM 13 as a work region. The CPU 11 controls each configuration and performs various calculation processes in accordance with the program recorded in the ROM 12 or the storage 14. In the present exemplary embodiment, the ROM 12 or the storage 14 stores a computer program for executing a process related to the job logs.

The ROM 12 stores various programs and various data. The RAM 13 temporarily stores a program or data as the work region. The storage 14 is configured with a storage apparatus such as a hard disk drive (HDD), a solid state drive (SSD), or a flash memory and stores various programs including an operating system and various data.

The input unit 15 includes a pointing device such as a mouse and a keyboard, and is used for providing various inputs.

The display unit 16 is, for example, a liquid crystal display and displays various information. The display unit 16 may function as the input unit 15 by employing a touch panel type.

The communication interface 17 is an interface for communicating with another apparatus such as the file server 20 or the cloud server 50 and, for example, uses standards such as Ethernet (registered trademark), FDDI, and Wi-Fi (registered trademark).

In executing the computer program described above, the multifunction peripheral 10 implements various functions using hardware resources described above.

Next, functional configurations of the multifunction peripheral 10 will be described.

Figure 3:
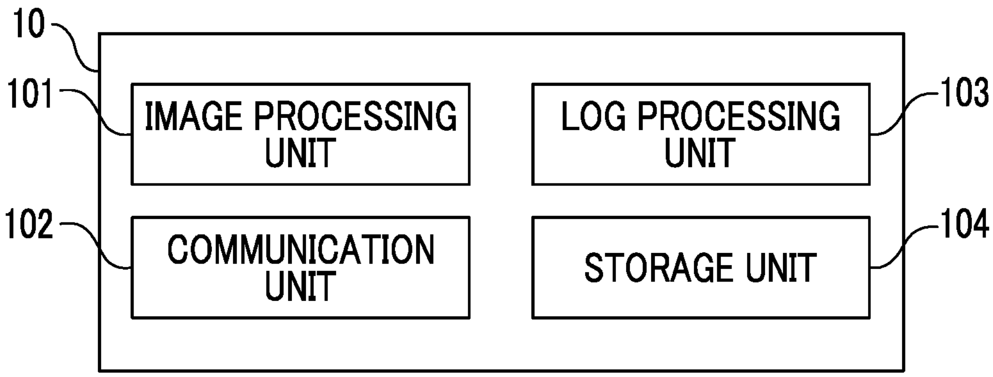
FIG. 3 is a block diagram illustrating a functional configuration example of the multifunction peripheral.

FIG. 3 is a block diagram illustrating an example of the functional configurations of the multifunction peripheral 10.

As illustrated in FIG. 3, the multifunction peripheral 10 includes an image processing unit 101, a communication unit 102, a log processing unit 103, and a storage unit 104 as the functional configurations. Each functional configuration is implemented by causing the CPU 11 to read out and execute the computer program stored in the ROM 12 or the storage 14.

The image processing unit 101 executes various image processing as a function of the multifunction peripheral 10. In the present exemplary embodiment, the image processing unit 101 executes image processing of generating scan data by optically scanning a document.

The communication unit 102 performs a communication process with another apparatus. Specifically, the communication unit 102 performs transmission of the scan data generated by the image processing unit 101 to the cloud server 50, reception of the text data generated by the cloud server 50, transmission of the text data to the file server 20, and the like.

The log processing unit 103 executes the process related to the job logs with respect to the image processing executed by the image processing unit 101 and the communication process executed by the communication unit 102. The log processing unit 103 records details about the image processing executed by the image processing unit 101 and the communication process executed by the communication unit 102 as the job logs and stores the recorded job logs in the storage unit 104. Content recorded as the job logs includes a job ID for identifying a series of processes, a date and time of execution of a process, processing content (for example, the number of scanned pages and an apparatus name or an IP address of a transmission destination of data), and a processing result (normal finish or finish with failure).

In a case of causing the cloud server 50 to execute a part of the image processing, the log processing unit 103 links a unified job ID generated for executing the image processing in the cloud server 50 to the job ID generated for the image processing. Information about the unified job ID linked to the job ID may be recorded in the job logs or may be recorded in association with the job logs.

The storage unit 104 stores various information. In the present exemplary embodiment, the storage unit 104 stores the job logs recorded by the log processing unit 103.

Next, a hardware configuration of the cloud server 50 will be described.

Figure 4:
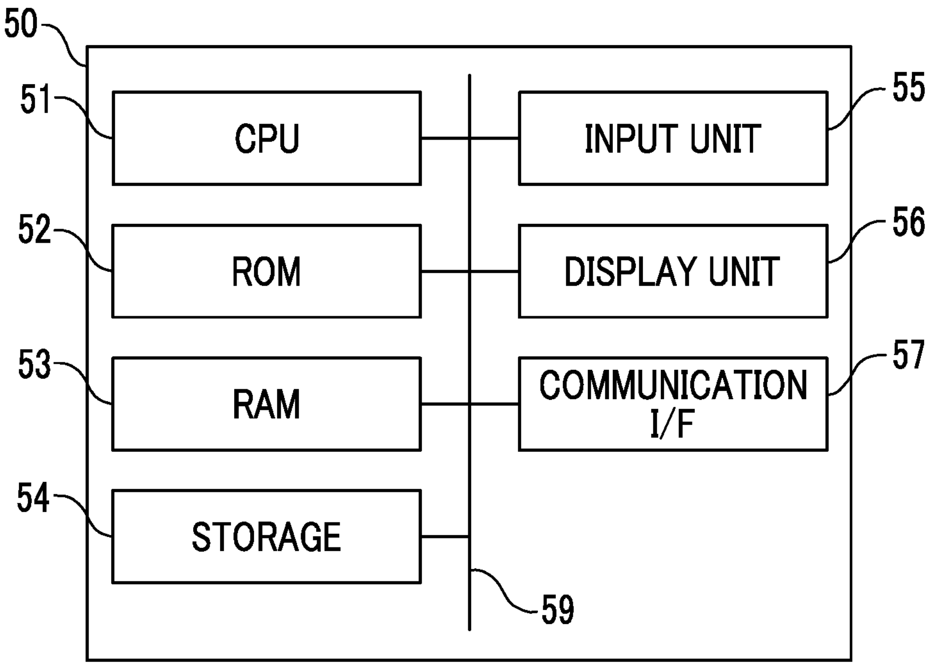
FIG. 4 is a block diagram illustrating a hardware configuration of a cloud server.

FIG. 4 is a block diagram illustrating a hardware configuration of the cloud server 50.

As illustrated in FIG. 4, the cloud server 50 includes a CPU 51, a ROM 52, a RAM 53, a storage 54, an input unit 55, a display unit 56, and a communication interface (I/F) 57. These configurations are communicably connected to each other via a bus 59.

The CPU 51 is an example of a second processor according to the exemplary embodiment of the present invention. The CPU 51 is a central calculation processing unit and executes various programs or controls each unit. That is, the CPU 51 reads a program from the ROM 52 or the storage 54 and executes the program using the RAM 53 as a work region. The CPU 51 controls each configuration and performs various calculation processes in accordance with the program recorded in the ROM 52 or the storage 54. In the present exemplary embodiment, the ROM 52 or the storage 54 stores a computer program for executing the process related to the job logs.

The ROM 52 stores various programs and various data. The RAM 53 temporarily stores a program or data as the work region. The storage 54 is configured with a storage apparatus such as an HDD, an SSD, or a flash memory and stores various programs including an operating system and various data.

The input unit 55 includes a pointing device such as a mouse and a keyboard, and is used for providing various inputs.

The display unit 56 is, for example, a liquid crystal display and displays various information. The display unit 56 may function as the input unit 55 by employing a touch panel type.

The communication interface 57 is an interface for communicating with another apparatus such as the multifunction peripheral 10 and, for example, uses standards such as Ethernet (registered trademark), FDDI, and Wi-Fi (registered trademark).

In executing the computer program described above, the cloud server 50 implements various functions using hardware resources described above.

Next, functional configurations of the cloud server 50 will be described.

Figure 5:
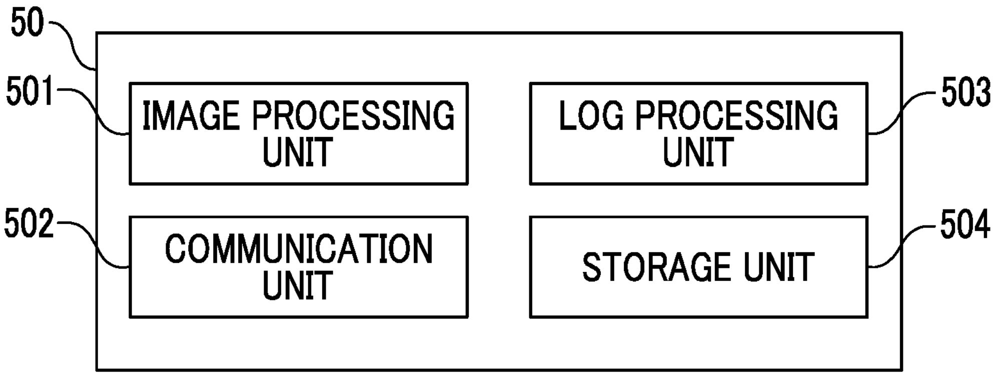
FIG. 5 is a block diagram illustrating a functional configuration example of the cloud server.

FIG. 5 is a block diagram illustrating a functional configuration example of the cloud server 50.

As illustrated in FIG. 5, the cloud server 50 includes an image processing unit 501, a communication unit 502, a log processing unit 503, and a storage unit 504 as the functional configurations. Each functional configuration is implemented by causing the CPU 51 to read out and execute the computer program stored in the ROM 52 or the storage 54.

The image processing unit 501 executes image processing on data transmitted from the multifunction peripheral 10. In the present exemplary embodiment, the image processing unit 501 generates the text data from the scan data by executing an OCR process on the scan data generated in the multifunction peripheral 10.

The communication unit 502 performs a communication process with another apparatus. Specifically, the communication unit 502 performs transmission of the text data generated by the image processing unit 501 to the multifunction peripheral 10 that has transmitted the scan data, and the like. Since the firewall 40 is provided between the multifunction peripheral 10 and the cloud server 50, the transmission of the text data from the cloud server 50 to the multifunction peripheral 10 is performed in the form of causing the multifunction peripheral 10 to download the text data from the cloud server 50.

The log processing unit 503 executes the process related to the job logs with respect to the image processing executed by the image processing unit 501 and the communication process executed by the communication unit 502. The log processing unit 503 records details about the image processing executed by the image processing unit 501 and the communication process executed by the communication unit 502 as the job logs and stores the recorded job logs in the storage unit 504. Content recorded as the job logs includes a unified job ID for identifying a series of processes, a date and time of execution of a process, processing content (for example, the number of pages of which conversion is completed, and an apparatus name or an IP address of a transmission destination of data), and a processing result (normal finish or finish with failure).

In a case where a request to execute a part of the image processing is made from the multifunction peripheral 10, the log processing unit 503 generates the unified job ID for executing the image processing in the cloud server 50 and notifies the requester multifunction peripheral 10 of the generated unified job ID.

The log processing unit 503 unifies the job logs transmitted from the multifunction peripheral 10 with the job logs generated by the log processing unit 503. In the unifying, the job logs generated by the log processing unit 503 and the job logs that have the job ID linked to the unified job ID of the job logs and that are transmitted from the multifunction peripheral 10 are unified.

The storage unit 504 stores various information. In the present exemplary embodiment, the storage unit 504 stores the job logs recorded by the log processing unit 503.

Next, an action of the image processing system 1 will be described.

Figure 6:
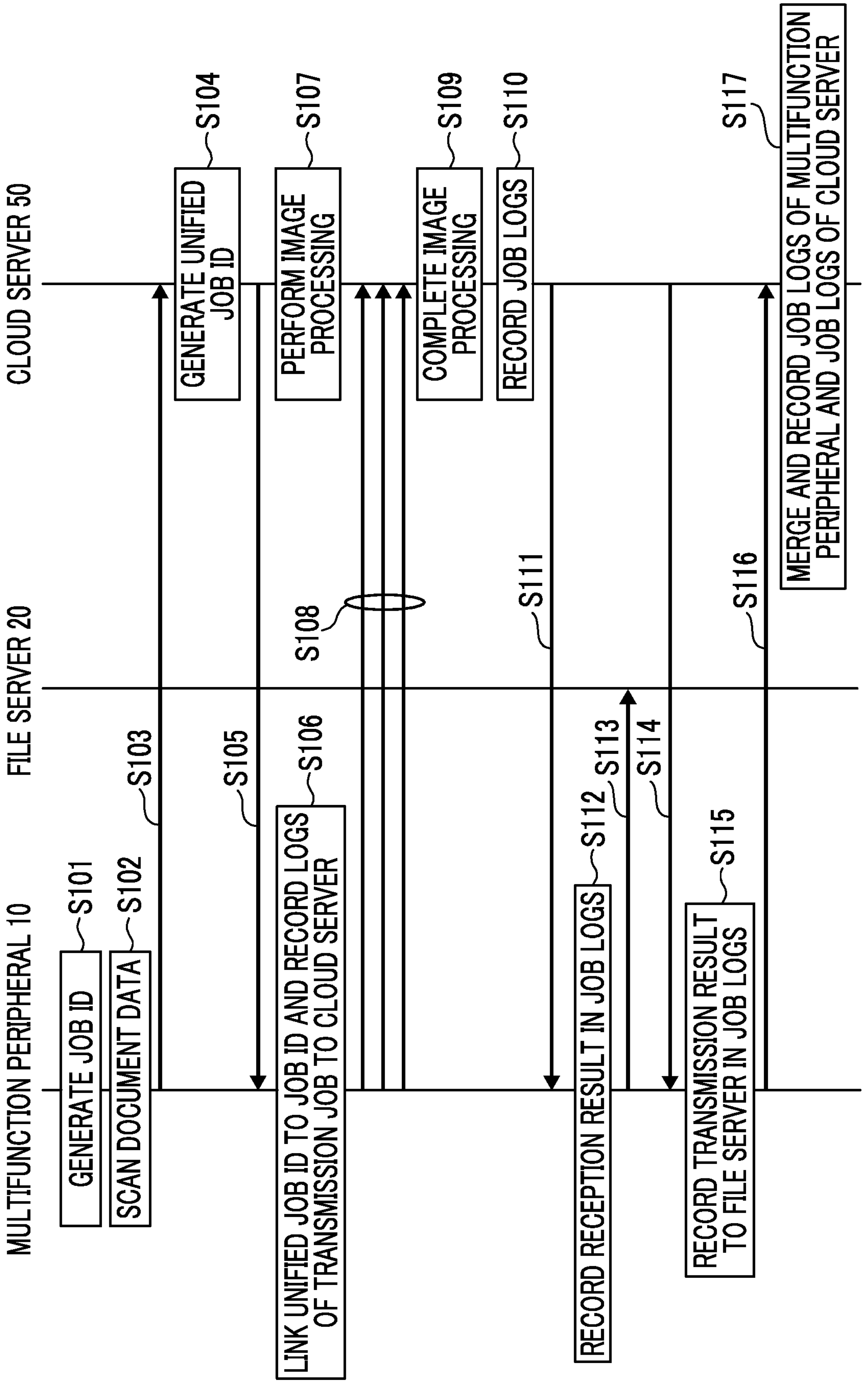
FIG. 6 is a sequence diagram illustrating a flow of image processing.

FIG. 6 is a sequence diagram illustrating a flow of image processing performed by the image processing system 1. In the multifunction peripheral 10, the image processing is performed by causing the CPU 11 to read the computer program from the ROM 12 or the storage 14 and load and execute the computer program in the RAM 13. In addition, in the cloud server 50, the image processing is performed by causing the CPU 51 to read the computer program from the ROM 52 or the storage 54 and load and execute the computer program in the RAM 53. The image processing performed in the sequence diagram illustrated in FIG. 6 is a process of scanning the document data and converting the scan data into the text data.

In a case where an instruction to scan the document data is provided from a user, the multifunction peripheral 10 generates the job ID in step S101.

After step S101, in step S102, the multifunction peripheral 10 scans the document data. The multifunction peripheral 10 records job logs related to the scanning of the document data.

After step S102, in step S103, the multifunction peripheral 10 transmits the scan data generated by scanning the document data and the job ID generated in step S101 to the cloud server 50 to request conversion from the scan data to the text data.

In step S104, the cloud server 50 generates the unified job ID.

After step S104, in step S105, the cloud server 50 notifies the multifunction peripheral 10 of the unified job ID generated in step S104.

In step S106, the multifunction peripheral 10 links the job ID generated in step S101 to the unified job ID of which the multifunction peripheral 10 is notified in step S105, and records the job logs about the scanning of the document data. In addition, in step S107, the cloud server 50 generates the text data by executing the image processing on the scan data transmitted from the multifunction peripheral 10. In step S108, the multifunction peripheral 10 performs periodic polling to the cloud server 50 in order to check whether or not the image processing is completed in the cloud server 50.

In a case where the image processing is completed in step S109, next, the cloud server 50 records job logs related to the image processing with the unified job ID generated in step S104 in step S110.

In step S111, the multifunction peripheral 10 receives the text data generated by the cloud server 50. After step S111, in step S112, the multifunction peripheral 10 records a reception result from the cloud server 50 in the job logs with the job ID generated in step S101.

After step S112, in step S113, the multifunction peripheral 10 transmits the text data received from the cloud server 50 to the file server 20.

In a case where the text data is received from the multifunction peripheral 10, the file server 20 transmits a transmission result from the multifunction peripheral 10 to the multifunction peripheral 10 in step S114.

In step S115, the multifunction peripheral 10 records the transmission result of the text data to the file server 20 in the job logs with the job ID generated in step S101.

After step S115, in step S116, the multifunction peripheral 10 transmits the job logs recorded in the series of processes to the cloud server 50.

In a case where the job logs are received from the multifunction peripheral 10, the cloud server 50 merges (unifies) the received job logs with the job logs recorded in step S110 and records the merged job logs in step S117. In merging the job logs of the multifunction peripheral 10 with the job logs of the cloud server 50, the cloud server 50 uses a result of the linking between the job ID and the unified job ID in the multifunction peripheral 10.

The multifunction peripheral 10 and the cloud server 50 enable the processing result to be easily checked by executing the series of processes illustrated in FIG. 6, compared to a case of acquiring the job logs from both of the multifunction peripheral 10 and the cloud server 50 and comparing the job logs.

In the series of processes illustrated in FIG. 6, the cloud server 50 acquires the job logs from the multifunction peripheral 10, and the cloud server 50 unifies the job logs. However, the present invention is not limited to this example.

For example, the multifunction peripheral 10 may acquire the job logs from the cloud server 50 in receiving the text data generated by the cloud server 50 in step S111, and unify the job logs of the multifunction peripheral 10 with the job logs of the cloud server 50 after recording the job logs in step S115.

In addition, for example, the multifunction peripheral 10 or the cloud server 50 may unify the job logs at a point in time when the user refers to the job logs. For example, at a timing when a request to refer to the job logs is made to the multifunction peripheral 10 from the user, the multifunction peripheral 10 may transmit the job logs to the cloud server 50, the cloud server 50 may unify the job logs, and the multifunction peripheral 10 may download the unified job logs from the cloud server 50. In this case, the cloud server 50 may convert the job logs into visualized information to be output in the multifunction peripheral 10 after unifying the job logs, and the multifunction peripheral 10 may download the visualized information from the cloud server 50. The visualized information may be, for example, image data or PDF data. The request to refer to the job logs may be made by an apparatus such as a personal computer connected to the LAN 30.

In addition, for example, at a timing when the request to refer to the job logs is made to the multifunction peripheral 10 from the user, the multifunction peripheral 10 may request the cloud server 50 to transmit the job logs and may unify the job logs downloaded from the cloud server 50 with the job logs of the multifunction peripheral 10.

In addition, for example, the multifunction peripheral 10 may acquire the job logs from the cloud server 50 at a time of loopback from the cloud server 50.

In addition, for example, at a timing when the multifunction peripheral 10 transmits the scan data to the cloud server 50, and at a timing when the transmission of the text data to the file server 20 is completed, the multifunction peripheral 10 may transmit the job logs to the cloud server 50, and the cloud server 50 may unify the job logs.

The image processing executed by causing the CPU to read software (program) in the exemplary embodiment may be executed by various processors other than the CPU. In this case, the processors are illustrated by a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute a specific process, and the like. In addition, the image processing may be executed by one of these various processors or may be executed by a combination of two or more processors of the same type or different types (for example, a plurality of FPGAs and a combination of a CPU and an FPGA). In addition, a hardware structure of these various processors is specifically an electric circuit in which circuit elements such as semiconductor elements are combined.

While an aspect in which the program for the image processing is prestored (installed) in the ROM or the storage is described in the exemplary embodiment, the present invention is not limited to the aspect. The program may be provided in the form of a recording on a non-temporary (non-transitory) recording medium such as a compact disk read only memory (CD-ROM), a digital versatile disk read only memory (DVD-ROM), and a universal serial bus (USB) memory. In addition, the program may be in the form of a download from an outside apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a first information processing apparatus that executes a predetermined process; and a second information processing apparatus that is communicably connected to the first information processing apparatus via a firewall and that executes a part of the process in response to a request from the first information processing apparatus, wherein the first information processing apparatus includes a first processor, the first processor is configured to:

record, in executing a first part of the process, logs of the process with a first identifier for identifying the process; and transmit a first processing result generated by the first part of the process and the first identifier to the second information processing apparatus and request the second information processing apparatus to execute a second part of the process, wherein the second information processing apparatus includes a second processor, the second processor is configured to:

generate a second identifier and notify the first information processing apparatus of the second identifier;

record, in executing the second part of the process, logs of the process with the second identifier for identifying the process; and transmit a second processing result generated by the second part of the process and the second identifier to the first information processing apparatus, and wherein the first processor or the second processor is configured to:

link the first identifier to the second identifier and record the logs recorded by the first processor and the logs recorded by the second processor in a unified manner.

2. The information processing system according to claim 1, wherein the first processor is configured to:

transmit the logs recorded by the first processor to the second information processing apparatus at a timing when the process in the first information processing apparatus is completed, and wherein the second processor is configured to:

record the logs recorded by the first processor and the logs recorded by the second processor in a unified manner.

3. The information processing system according to claim 2, wherein the first processor is configured to:

check whether or not unifying of the logs is completed in the second information processing apparatus and, in a case where the unifying is completed, acquire the unified logs from the second information processing apparatus.

4. The information processing system according to claim 1, wherein the first processor is configured to:

at a timing when the process in the second information processing apparatus is completed, acquire the logs recorded by the second processor from the second information processing apparatus and record the logs recorded by the first processor and the logs recorded by the second processor in a unified manner.

5. The information processing system according to claim 1, wherein the first processor is configured to:

transmit the logs recorded by the first processor to the second information processing apparatus at a timing when an instruction to refer to the logs of the process is received, and wherein the second processor is configured to:

record the logs recorded by the first processor and the logs recorded by the second processor in a unified manner.

6. The information processing system according to claim 5, wherein the first processor is configured to:

acquire the logs recorded in a unified manner by the second processor from the second information processing apparatus.

7. The information processing system according to claim 5, wherein the second processor is configured to:

convert the logs recorded in a unified manner into visualized information, and wherein the first processor is configured to:

acquire the visualized information converted by the second processor from the second information processing apparatus.

8. The information processing system according to claim 1, wherein the first processor is configured to:

at a timing when an instruction to refer to the logs of the process is received, acquire the logs recorded by the second processor from the second information processing apparatus and record the logs recorded by the first processor and the logs recorded by the second processor in a unified manner.

9. The information processing system according to claim 1, wherein the first processor is configured to:

transmit the logs recorded by the first processor to the second information processing apparatus at a timing when the process is requested to the second information processing apparatus, and at a timing when the process in the first information processing apparatus is completed, and wherein the second processor is configured to:

record the logs recorded by the first processor and the logs recorded by the second processor in a unified manner.

10. The information processing system according to claim 1, wherein the first information processing apparatus is a multifunction peripheral, wherein the second information processing apparatus is a cloud server.

11. The information processing system according to claim 10, wherein the first information processing apparatus performs scanning on a document to generate scan data as the first processing result generated by the first part of the process, and wherein the second information processing apparatus performs optical character recognition on the scan data to generate text data as the second processing result generated by the second part of the process.

12. A non-transitory computer readable medium storing an information processing program causing a computer, as a first information processing apparatus, to execute a process comprising:

recording, in executing a first part of a predetermined process, logs of the process with a first identifier for identifying the process;

transmitting a first processing result generated by the first part of the process and the first identifier to a second information processing apparatus and requesting the second information processing apparatus to execute a second part of the process;

receiving a notification of a second identifier received from and generated by the second information processing apparatus, wherein the second information processing apparatus records, in executing the second part of the process, logs of the process with the second identifier for identifying the process;

receiving a second processing result generated by a second part of the process and the second identifier from the second information processing apparatus; and linking the first identifier to the second identifier and recording the logs recorded with the first identifier and the logs recorded with the second identifier in a unified manner.

13. A non-transitory computer readable medium storing an information processing program causing a computer, as a second information processing apparatus, to execute a process comprising:

receiving a first processing result generated by a first part of the process, a first identifier, and a request to execute a second part of the process from the first information processing apparatus, wherein the first information processing apparatus records, in executing the first part of the process, logs of the process with the first identifier for identifying the process;

generating a second identifier and notifying the first information processing apparatus of the second identifier;

recording, in executing the second part of the process, logs of the process with the second identifier for identifying the process;

transmitting a second processing result generated by the second part of the process and the second identifier to the first information processing apparatus; and linking the first identifier to the second identifier and recording the logs recorded by the first processor and the logs recorded by the second processor in a unified manner.

* * * * *